Oct. 25, 1949.  A. J. CULP  2,486,007
MUFFLER WITH VALVED EXHAUST TRAP
Filed Jan. 26, 1945  2 Sheets-Sheet 1
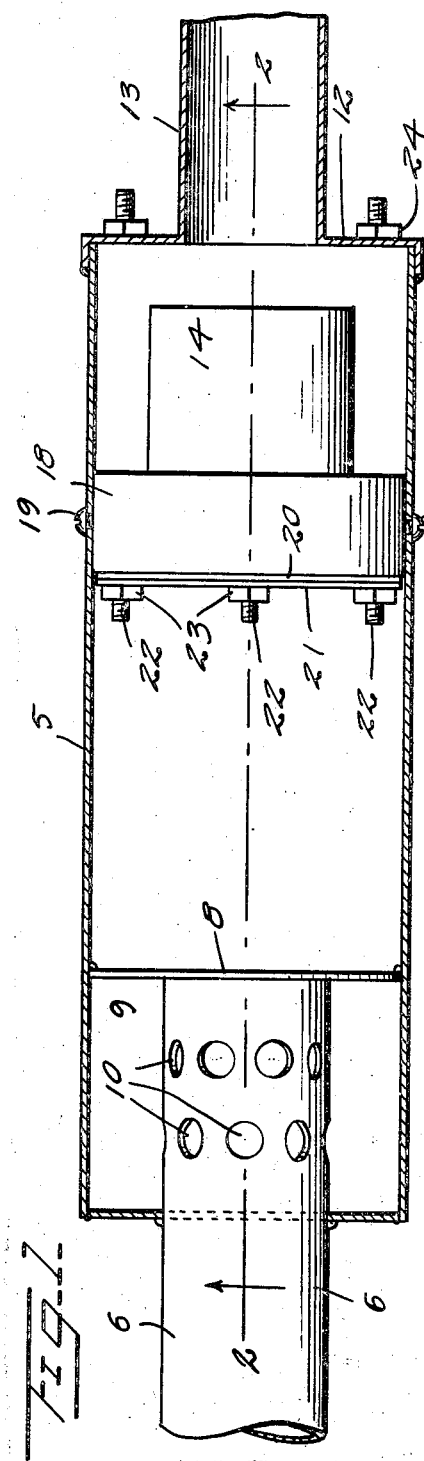
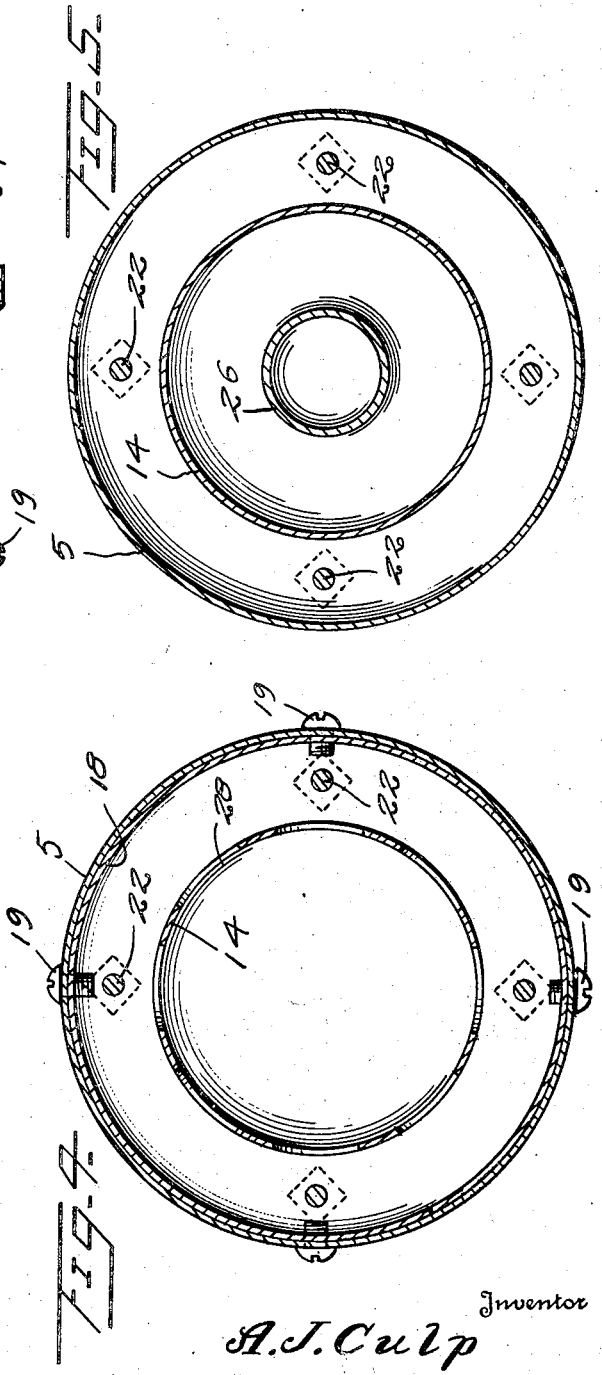
Inventor
A. J. Culp
By Randolph & Beavers
Attorneys

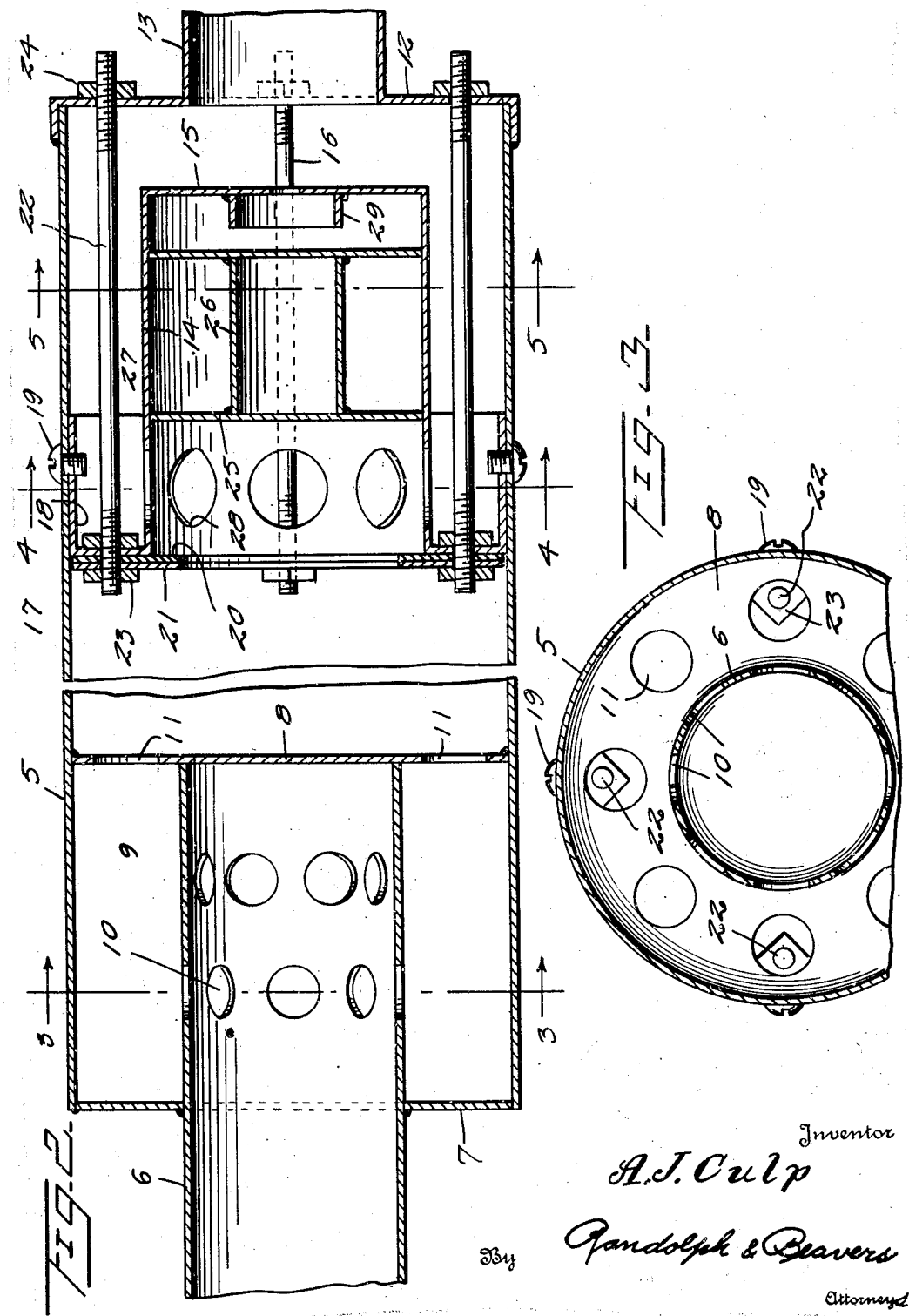

Patented Oct. 25, 1949

2,486,007

UNITED STATES PATENT OFFICE 2,486,007

MUFFLER WITH VALVED EXHAUST TRAP

Arthur J. Culp, Clanton, Ala.

Application January 26, 1945, Serial No. 574,644

2 Claims. (Cl. 181—64)

1

The present invention relates to new and useful improvements in exhaust traps for internal combustion engines and has for an important object to provide a novel and simple device of this character adapted to prevent any back pressure in the cylinders of the engine when the exhaust valves thereof are open.

More specifically the invention comprises an exhaust trap of this character which includes a freely movable valve adapted to quickly open to permit the discharge of gas to escape from the trap and adapted to quickly close to prevent air or back pressure from entering the trap.

Accordingly it is an object of the present invention to provide an automatic valve mounted in the trap and which is responsive to pressure of the exhaust from the engine to open said valve to permit free discharge of exhaust gases from the trap and to close the valve upon the creation of back pressure or vacuum in the trap and thus eliminate the creation of back pressure in the cylinders of the engine.

A further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a longitudinal sectional view of the trap with the valve housing shown in elevation.

Figure 2 is an enlarged longitudinal sectional view taken substantially on a line 2—2 of Figure 1 and Figures 3, 4 and 5 are transverse sectional views taken respectively on lines 3—3, 4—4 and 5—5 of Figure 2.

Referring now to the drawings in detail wherein for the purpose of illustration I have disclosed a preferred embodiment of the invention. The numeral 5 designates the trap casing to one end of which a pipe 6 is attached leading from the exhaust pipe of the engine.

The trap 5 is of substantially cylindrical construction with the pipe 6 projecting through the front wall 7 thereof. The inner end of the pipe 6 abuts a transverse partition 8 suitably secured in the trap and spaced from the front wall 7 thereof to form an annular chamber 9 surrounding the inner end of the pipe 6 at the front end of the trap.

The inner end of the pipe 6 is formed with a plurality of openings 10 in the walls thereof communicating with the chamber 9 and the partition 8 is formed with a plurality of openings 11 adjacent its edges to permit escape of the exhaust gases from the chamber 9 into the rear portion of the trap.

A removable cover plate 12 closes the rear end of the trap and to which is attached an outlet pipe 13.

A cylindrical valve housing 14 is positioned in the rear portion of the trap 5 with its walls in spaced relation from the walls of the trap, the rear end of the housing 14 being closed by an end wall 15 which is spaced inwardly from the cover plate 12 and is formed with a breather port 16.

The front end of the valve housing 14 is formed with an outwardly projecting flange 17, the outer edge of which is bent longitudinally from the valve housing in spaced relation therefrom to form an annular flange 18 positioned against the inner walls of the trap 5 and secured thereto by bolts or screws 19.

A soft metal gasket 20 is positioned against the flange 17 with the inner edge of the gasket partially overlying the open front end of the valve housing 14 to form a valve seat, the gasket being held in position by an annular plate 21 positioned against the outer surface thereof.

The gasket 20 and plate 21 are secured in position by longitudinally extending bolts 22 having their front ends extended through the flange 17 as well as through the gasket 20 and the plate 21 and secured in assembled relation by the nuts 23. The rear end of the bolts 22 extend through the cover plate 12 and are secured thereto by the nuts 24.

Accordingly by removing the bolts or screws 19 the cover plate 12 and valve housing 14 may be removed as a unit from the trap.

A valve 25 in the form of a spool is freely mounted in the valve housing 14, the valve including the hub portion 26 and flange 27 at each end thereof, the edges of the flanges being in substantially closely spaced relation with respect to the inner walls of the valve housing. The walls of the valve housing 14 adjacent its front end are formed with a plurality of openings 28 adapted to be cut-off from the source of exhaust gases upon the movement of the valve 25 forwardly against the gasket 20.

The valve 25 is responsive to the pressure of exhaust gases entering the trap through the exhaust pipe 6 to move the valve rearwardly to uncover the openings 28 and permit the exhaust gases to enter the rear end of the trap and escape through the pipe 13.

An annular stop member 29 is secured to the inside of the rear wall 15 of the valve housing to limit the rearward movement of the valve, the area of the valve housing surrounding the stop 29 and serving as an air cushion space.

By reason of the free movement of the valve 25 in the valve housing 14 the pressure of the exhaust gases entering the trap 5 will force the valve rearwardly to permit escape of the exhaust gases from the trap and upon creation of vacuum or back pressure in the trap the valve 25 will be moved forwardly to thus close the rear end of the trap and prevent atmospheric communication with the cylinders of the engine to which the trap is attached.

It is belived that the details of construction, manner of operation and advantages of the device will be readily understood from the foregoing without further detailed explanation.

While the foregoing specification sets forth the invention in specific terms, it is to be understood that numerous changes in the shape, size and materials may be resorted to without departing from the spirit and scope of the invention as claimed hereinafter.

Having thus described the invention what I claim is:

1. An exhaust trap valve comprising a valve unit adapted to be detachably mounted in the open rear outlet end of the casing of an exhaust trap of an internal combustion engine, said unit including an end wall for engaging the open rear end of the trap casing, a tail pipe supported by said end wall and having one end opening therethrough into the unit, an elongated valve housing disposed within the trap casing, longitudinally thereof and spaced from said end wall, said housing having an open forward end and a side wall spaced from the trap casing wall and provided with a communicating port, a valve freely slidable in the housing for closing or exposing the passage of the housing between its open forward end and said port, and the opposite, rear end wall of the housing having a breather port therein whereby a back pressure in the valve unit from the tail pipe will force the valve forward for closing the passage between the port and the open forward end of the housing, said rear end wall of the housing having an inwardly and forwardly extending flange surrounding the breather port and combining therewith to form an air cushion in the rear end of the housing restricting the rearward movement of the valve toward said breather port.

2. An exhaust trap valve comprising a valve unit adapted to be detachably mounted in the open rear outlet end of the casing of an exhaust trap of an internal combustion engine, said unit including an end wall for engaging the open rear end of the trap casing, a tail pipe supported by said end wall and having one end opening therethrough into the unit, an elongated valve housing disposed within the trap casing, longitudinally thereof and spaced from said end wall, said housing having an open forward end and a side wall spaced from the trap casing wall and provided with a communicating port, a valve freely slidable in the housing for closing or exposing the passage of the housing between its open forward end and said port, the opposite, rear end wall of the housing having a breather port therein whereby a back pressure in the valve unit from the tail pipe will force the valve forward for closing the passage between the port and the open forward end of the housing, and said unit including means for detachably and adjustably connecting the valve housing and said first mentioned end wall of the unit, said means including an annular wall member adapted to be detachably secured to the trap casing wall and closing the space between said casing wall and the valve housing, adjacent the forward end of said housing and forwardly of said communicating port.

ARTHUR J. CULP.

REFERENCES CITED

The following references are of record in the file of this patent:

UNITED STATES PATENTS

| Number | Name | Date |
| --- | --- | --- |
| 516,532 | Hill | Mar. 13, 1894 |
| 722,567 | Crawford | Mar. 10, 1903 |
| 966,390 | Elder | Aug. 2, 1910 |
| 1,666,005 | Culp | Apr. 10, 1928 |
| 1,776,060 | Beckwith | Sept. 16, 1930 |
| 1,807,512 | Culp | May 26, 1931 |

FOREIGN PATENTS

| Number | Country | Date |
| --- | --- | --- |
| 714,192 | France | Sept. 1, 1931 |